(12) United States Patent
Yaginuma et al.

(10) Patent No.: US 9,361,789 B2
(45) Date of Patent: Jun. 7, 2016

(54) REMOTE CONTROL SYSTEM

(71) Applicant: PANASONIC CORPORATION, Osaka (JP)

(72) Inventors: Masanobu Yaginuma, Kanagawa (JP); Takuhisa Mori, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 137 days.

(21) Appl. No.: 14/388,265

(22) PCT Filed: Mar. 21, 2013

(86) PCT No.: PCT/JP2013/001916
§ 371 (c)(1),
(2) Date: Sep. 26, 2014

(87) PCT Pub. No.: WO2013/145655
PCT Pub. Date: Oct. 3, 2013

(65) Prior Publication Data
US 2015/0048930 A1 Feb. 19, 2015

(30) Foreign Application Priority Data
Mar. 26, 2012 (JP) ................ 2012-069322

(51) Int. Cl.
*G08C 17/02* (2006.01)
*H04M 1/725* (2006.01)
(Continued)

(52) U.S. Cl.
CPC ........... *G08C 17/02* (2013.01); *H04M 1/72533* (2013.01); *H04N 5/4403* (2013.01); *H04N 21/42204* (2013.01); *G08C 2201/20* (2013.01)

(58) Field of Classification Search
CPC ............... G08C 17/02; G08C 2201/93; G08C 2201/30; G08C 2201/92; G08C 23/04
USPC ............ 340/12.22–12.55; 455/41.2, 419–420
See application file for complete search history.

(56) References Cited

U.S. PATENT DOCUMENTS

2002/0003467 A1* 1/2002 Musschebroeck ..... G08C 17/02
340/3.41
2003/0188028 A1 10/2003 Kawamura
(Continued)

FOREIGN PATENT DOCUMENTS

JP 2006-014064 A 1/2006
JP 2007-295045 A 11/2007
(Continued)

OTHER PUBLICATIONS

International Search Report for Application No. PCT/JP2013/001916 dated Apr. 23, 2013.

*Primary Examiner* — George Bugg
*Assistant Examiner* — Sharmin Akhter
(74) *Attorney, Agent, or Firm* — Pearne & Gordon LLP

(57) ABSTRACT

The present invention pertains to a remote control system, the objective being to improve operability. A main body communication control unit 13 of a display device 7 permits connection to a remote controller 8 when not being in a connected state to a remote controller 9 when the connection is requested from the remote controller 8, and on the other hand, disapproves the connection to the remote controller 8 and prompts the remote controller 8 to be connected to the remote controller 9 when being in the connected state to the remote controller 9 when the connection is requested from the remote controller 8.

2 Claims, 4 Drawing Sheets

(51) Int. Cl.
*H04N 21/422* (2011.01)
*H04N 5/44* (2011.01)

(56) References Cited

U.S. PATENT DOCUMENTS

2013/0267168 A1* 10/2013 Jeon ................. H04B 5/0025
 455/41.1

2015/0101503 A1* 4/2015 Brown ..................... F42D 1/05
 102/206

FOREIGN PATENT DOCUMENTS

| JP | 2011-010222 A | 1/2011 |
| JP | 2011-010223 A | 1/2011 |
| WO | 02/056548 A1 | 7/2002 |

* cited by examiner

REMOTE CONTROL SYSTEM

TECHNICAL FIELD

The present invention relates to a remote control system that remotely controls display contents of a display unit, for instance.

BACKGROUND ART

As a conventional remote control system of this kind, a system of remotely controlling a display unit of a display device by a plurality of remote controllers has been proposed. That is, since multiple people can simultaneously operate display contents of one display unit, a game can be enjoyed by multiple people for instance (for instance, Patent Literature 1 below).

CITATION LIST

Patent Literature

Patent Literature 1: Japanese Patent Laid-Open No. 2011-10222

SUMMARY OF INVENTION

Technical Problem

In the above-described conventional example, since display contents of one display unit are remotely controlled by a plurality of remote controllers, it is effective when a game is played by multiple people or the like, for instance.

However, in the system provided with a plurality of display units, since the display unit that is being viewed is set for each individual, when a person next to the individual operates the display unit, an unpleasant situation sometimes occurs. Accordingly, in such a system provided with the plurality of display units, for instance, exclusive remote controllers for the right and for the left are provided or one exclusive remote controller is switched for the right or for the left.

That is, in the conventional example, there has been a need for operating each of the plurality of display units by the exclusive remote controller, causing a situation with poor operability.

Therefore, an object of the present invention is to improve operability of a system.

Solution to Problem

In order to achieve the object, the present invention includes a display device and first and second remote controllers that remotely control the display device, the display device includes a display control unit, a plurality of display units connected to the display control unit, a main body communication control unit connected to the display control unit, and a main body command reception unit and a main body command transmission unit connected to the main body communication control unit, the first remote controller includes a first command reception unit and a first command transmission unit that perform transmission and reception to/from the main body command reception unit and the main body command transmission unit of the display device, a first communication control unit connected to the first command reception unit and the first command transmission unit, and a first operation unit connected to the first communication control unit, the second remote controller comprises a second command reception unit and a second command transmission unit that perform transmission and reception to/from the main body command reception unit and the main body command transmission unit of the display device, a second communication control unit connected to the second command reception unit and the second command transmission unit, and a second operation unit connected to the second communication control unit, the main body communication control unit of the display device is configured to permit connection to the first remote controller when not being in a connected state to the second remote controller when the connection is requested from the first remote controller, and to disapprove the connection to the first remote controller and prompt the first remote controller to be connected to the second remote controller when being in the connected state to the second remote controller when the connection is requested from the first remote controller, and thus the intended object is achieved.

Advantageous Effect of Invention

As described above, the present invention includes a display device and first and second remote controllers that remotely control the display device, the display device includes a display control unit, a plurality of display units connected to the display control unit, a main body communication control unit connected to the display control unit, and a main body command reception unit and a main body command transmission unit connected to the main body communication control unit, the first remote controller includes a first command reception unit and a first command transmission unit that perform transmission and reception to/from the main body command reception unit and the main body command transmission unit of the display device, a first communication control unit connected to the first command reception unit and the first command transmission unit, and a first operation unit connected to the first communication control unit, the second remote controller comprises a second command reception unit and a second command transmission unit that perform transmission and reception to/from the main body command reception unit and the main body command transmission unit of the display device, a second communication control unit connected to the second command reception unit and the second command transmission unit, and a second operation unit connected to the second communication control unit, the main body communication control unit of the display device is configured to permit connection to the first remote controller when not being in a connected state to the second remote controller when the connection is requested from the first remote controller, and to disapprove the connection to the first remote controller and prompt the first remote controller to be connected to the second remote controller when being in the connected state to the second remote controller when the connection is requested from the first remote controller, so that operability is improved.

That is, since the main body communication control unit of the display device in the present invention is configured to permit the connection to the first remote controller when not being in the connected state to the second remote controller when the connection is requested from the first remote controller, and to disapprove the connection to the first remote controller and prompt the first remote controller to be connected to the second remote controller when being in the connected state to the second remote controller when the connection is requested from the first remote controller, cellular phones owned by individuals for instance can be used as the first and second remote controllers that remotely control the display device, and the operability is improved since there is no need of taking the trouble to prepare exclusive remote controllers.

DESCRIPTION OF EMBODIMENTS

Hereinafter, one embodiment of the present invention will be described using attached drawings.

Figure 1:
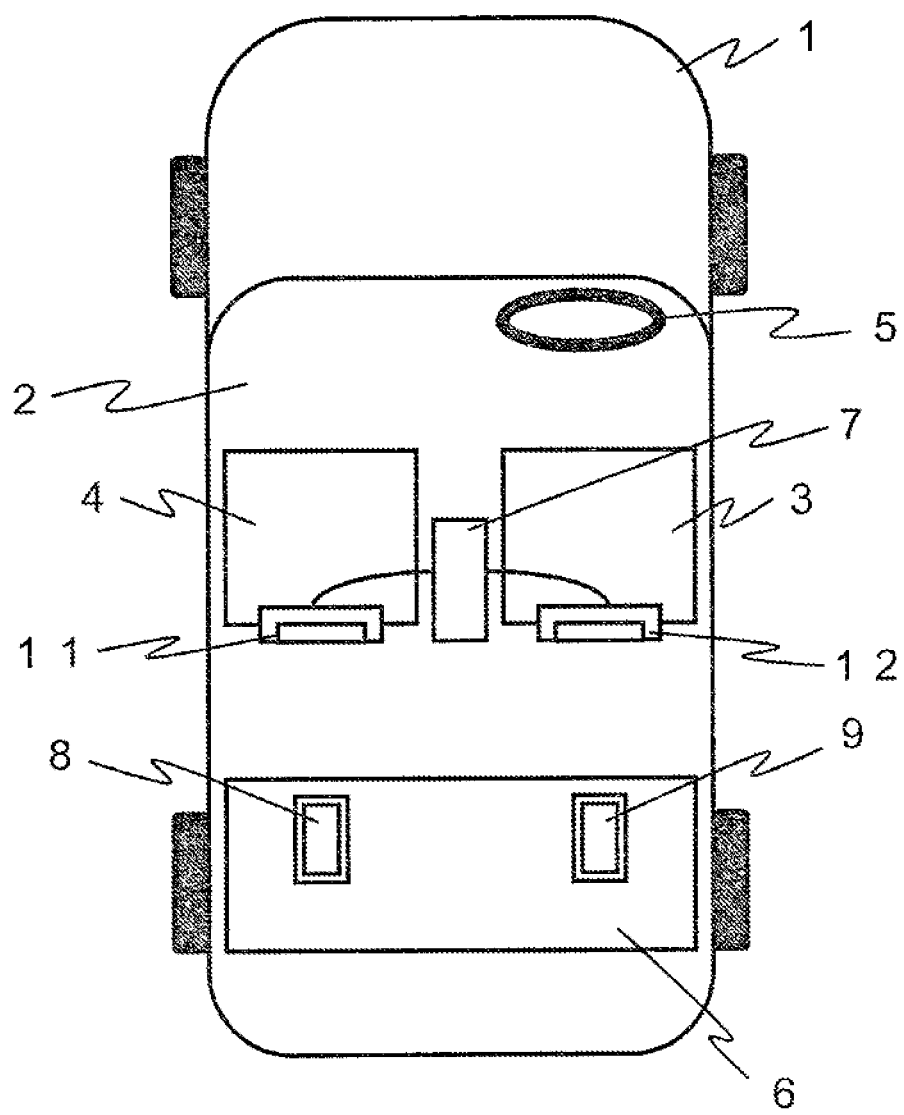
FIG. 1 is a diagram illustrating an automobile loaded with a remote control system according to one embodiment of the present invention.

In FIG. 1, reference numeral 1 denotes an automobile, a driver's seat 3 and a front passenger's seat 4 are disposed at the front of car interior 2, and a handle 5 is disposed at the front of the driver's seat 3. Also, at the back of the car interior 2, a rear seat 6 is disposed.

Further, a display device 7 is disposed between the driver's seat 3 and the front passenger's seat 4, and remote controllers 8 and 9 that remotely control the display device 7 are disposed on the left and right of the rear seat 6.

Here, the remote controllers 8 and 9 are individually owned as cellular phones by passengers seated on the left and right of the rear seat 6 for instance, and have a remote control function as well.

Figure 2:
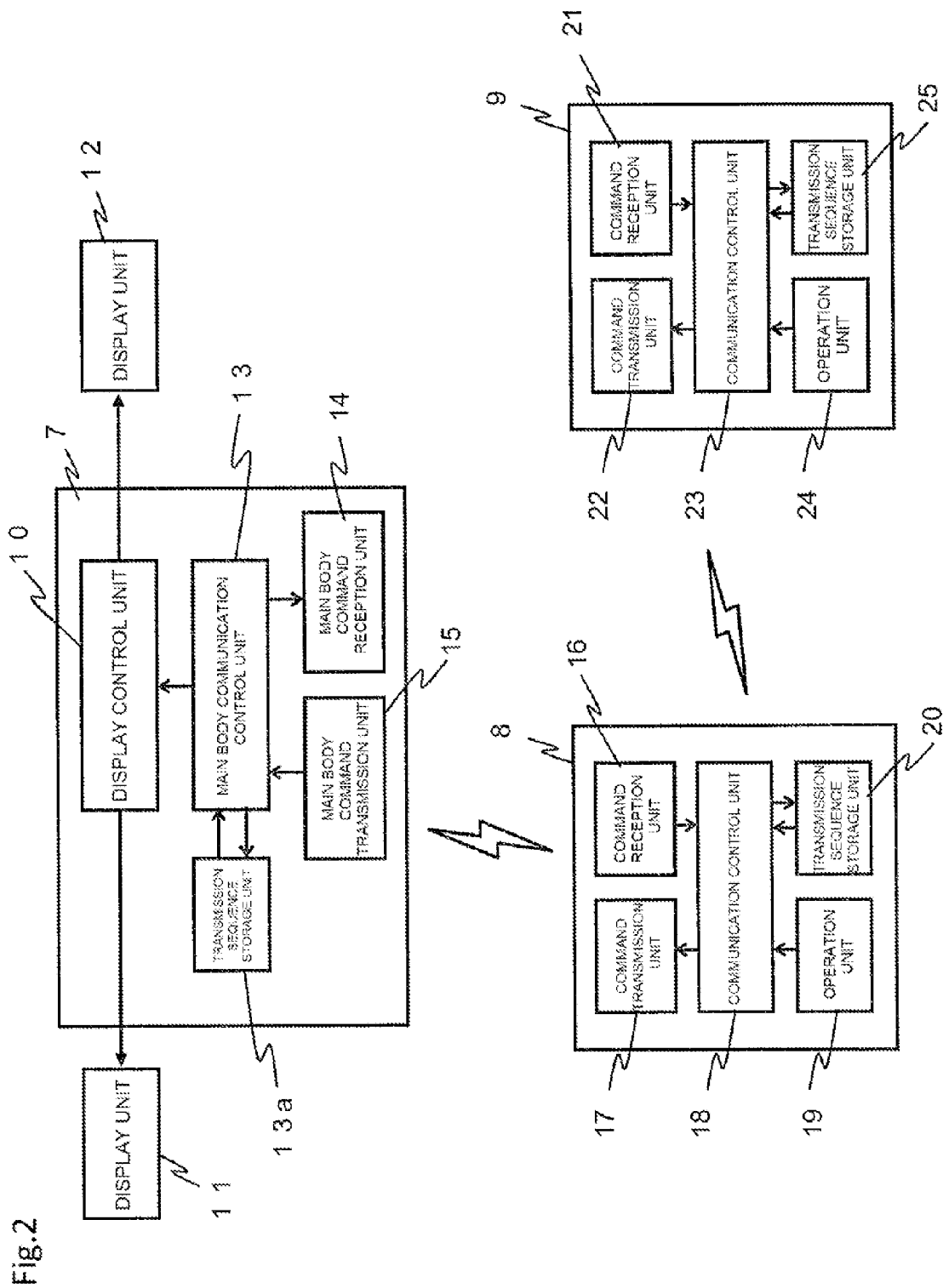
FIG. 2 is a control block diagram of the same.

FIG. 2 is a control block diagram of the above-described remote control system.

The display device 7 includes, as illustrated in FIG. 2, a display control unit 10, a plurality of display units 11 and 12 connected to the display control unit 10, a main body communication control unit 13 connected to the display control unit 10, and a main body command reception unit 14, a main body command transmission unit 15 and a transmission sequence storage unit 13a connected to the main body communication control unit 13.

The remote controller 8 includes a command reception unit 16 and a command transmission unit 17 that perform transmission and reception to/from the main body command reception unit 14 and the main body command transmission unit 15, a communication control unit 18 connected to the command reception unit 16 and the command transmission unit 17, and an operation unit 19 and a transmission sequence storage unit 20 connected to the communication control unit 18.

Further, the remote controller 9 includes a command reception unit 21 and a command transmission unit 22 that perform transmission and reception to/from the main body command reception unit 14 and the main body command transmission unit 15, a communication control unit 23 connected to the command reception unit 21 and the command transmission unit 22, and an operation unit 24 and a transmission sequence storage unit 25 connected to the communication control unit 23.

The remote controllers 8 and 9 are the cellular phones owned by the passengers seated on the left and right of the rear seat 6 as described above, and since functions of the cellular phones are well-known, descriptions are omitted in order to avoid complication of the descriptions.

In the above-described configuration, the display unit 11 is provided on a back surface side of the front passenger's seat 4, and the display unit 12 is provided on a back surface of the driver's seat 3.

The transmission sequence storage units 13a, 20 and 25 are for storing a transmission sequence beforehand.

Figure 3:
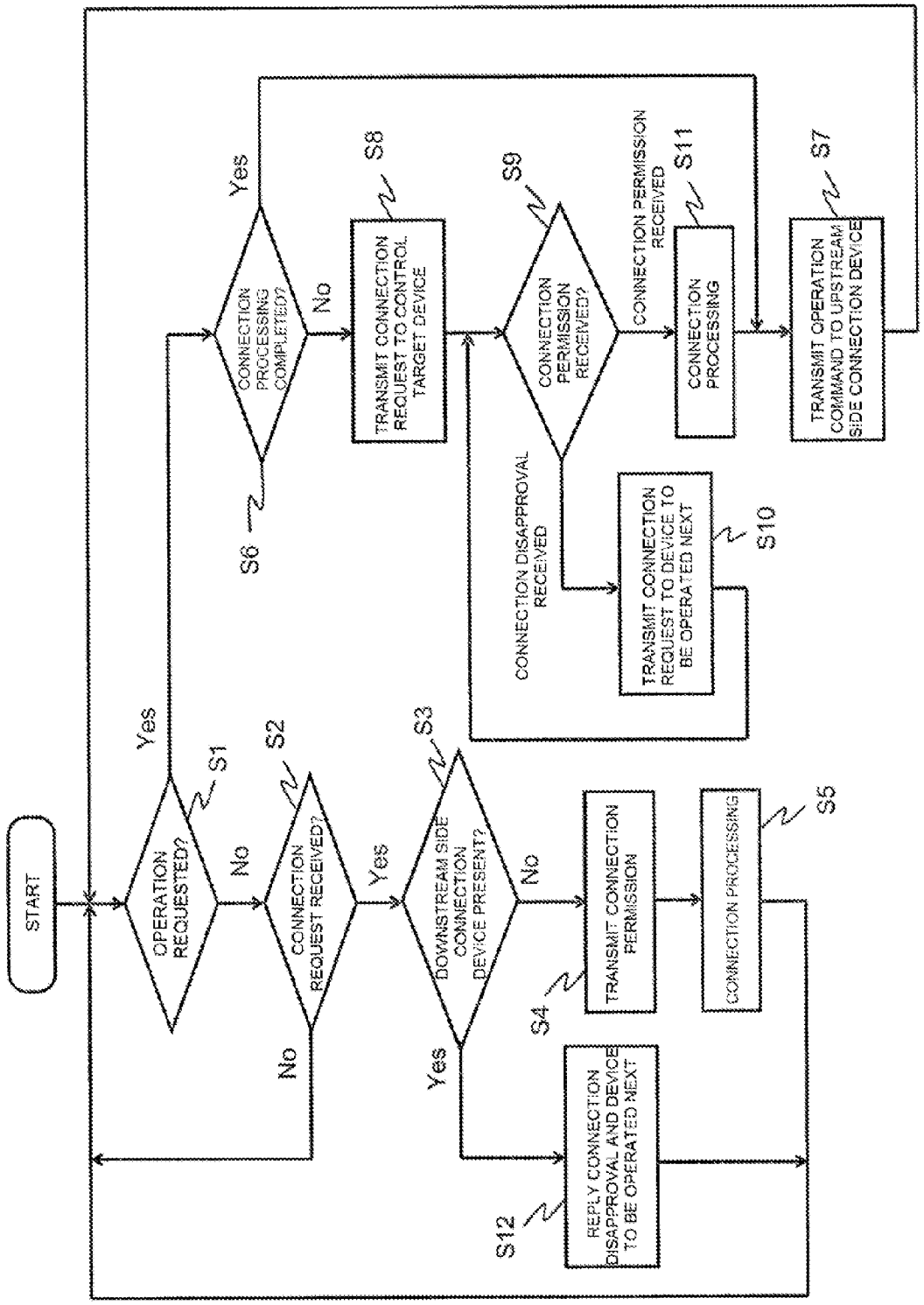
FIG. 3 is an operation flowchart on a remote controller side.

FIG. 3 is an operation flowchart on a remote controller side in the above-described remote control system.

In the following operation descriptions, a present state is assumed to be a situation where, in FIG. 1, the remote controller 8 is connected to the main body communication control unit 13 of the display device 7 in one-to-one correspondence by Bluetooth, and remote control is performed while the display unit 11 is being viewed.

Prior to this, the remote controller 8 and the display device 7 are connected first. That is, on the side of the remote controller 8, the remote control function thereof is activated.

The activation of the remote control function is not remote control by the operation unit 19. That is, since it is not an "operation request" (S1: No), an operation is shifted to step S2 to receive (Bluetooth) a connection request from the main body command transmission unit 15 of the display device 7 (S2: Yes).

This state is, for the remote controller 8, the state without a connection request from the remote controller 9 which is a downstream side connection device relative to the remote controller 8 (S3: No). Therefore, the operation is shifted to step S4 to transmit (Bluetooth) connection permission to the command reception unit 16 of the display device 7, and thus connection processing is completed (S5).

In the state that the connection processing is completed in such a manner, when the remote control is performed in the operation unit 19 of the remote controller 8, "connection requested" is determined in step S1 (S1: Yes), the operation is shifted to step S6, and since it is already "connection processing completed" (S6: Yes), the operation is shifted to step S7. In step S7, processing of transmitting an operation command to an upstream side connection device is performed. Specifically, the communication control unit 18 transmits (Bluetoothes) the operation command from the command transmission unit 17 to the main body command reception unit 14 of the display device 7, according to a transmission sequence stored in the transmission sequence storage unit 20.

Figure 4:
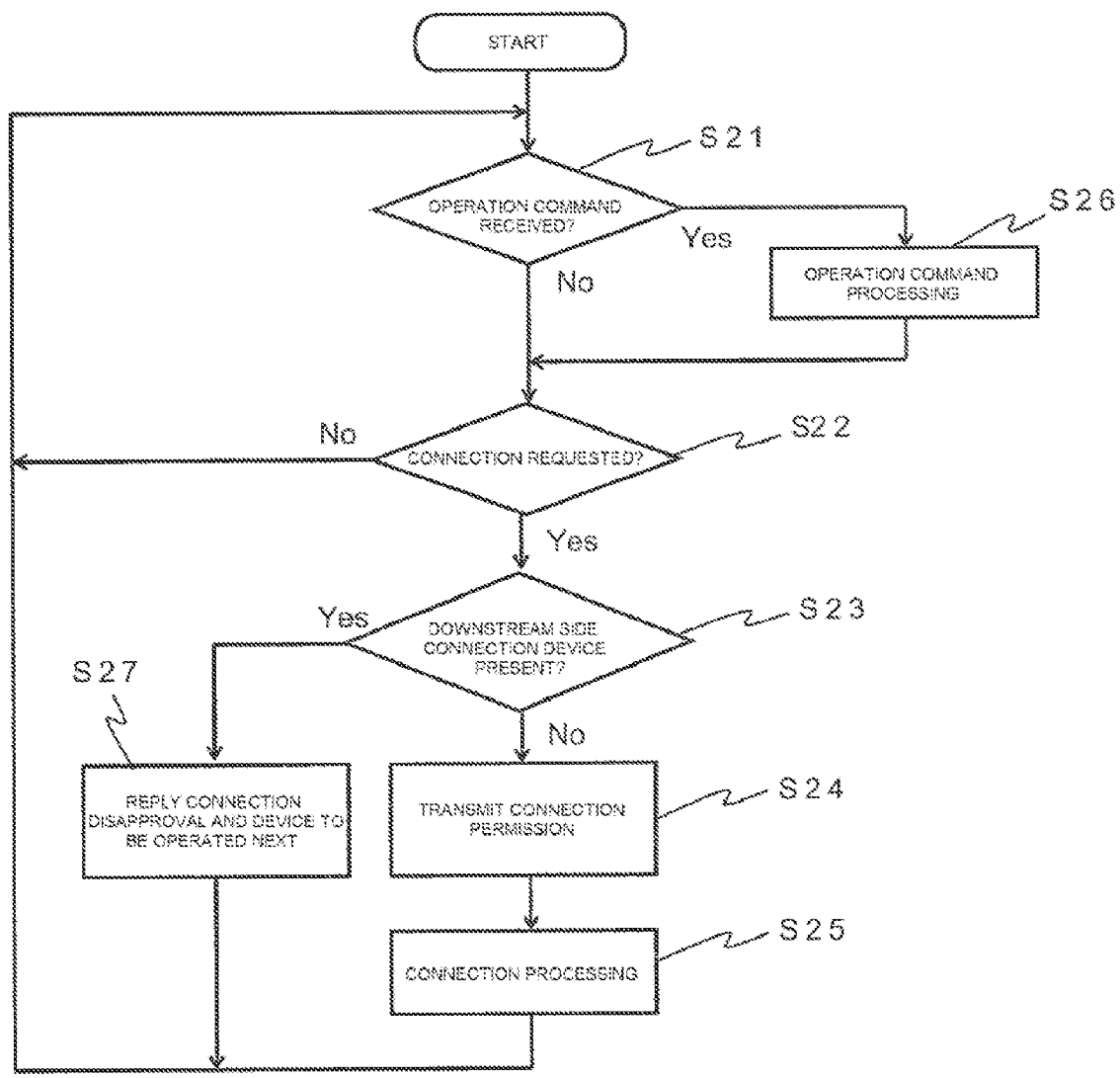
FIG. 4 is an operation flowchart on a display device side.

FIG. 4 is an operation flowchart on a display device side in the above-described remote control system.

On the side of the display device 7, when the connection is requested from the remote controller 8, since it is not the operation command (S21: No), the main body communication control unit 13 shifts to step S22 and determines reception of the connection request (S22: Yes). Since this state is the state without the connection to the remote controller 9 (S23: No), the main body communication control unit 13 shifts to step S24 to transmit (Bluetooth) the connection permission to the remote controller 8, and executes the connection processing (S25).

In this state, when the remote controller 8 performs the remote control, "operation command reception" is determined in step S21 (S21: Yes), and the operation is shifted to step S26. In step S21, the main body communication control unit 13 processes the operation command and remotely controls the display contents of the display unit 11 through the display control unit 10.

Then, in the state of remotely controlling the display unit 11 by the remote controller 8 in such a manner, when another person who owns the remote controller 9 is to remotely control the display unit 12 present in front of the person himself/herself, the main body communication control unit 13 of the display device 7 shifts to step S23 by determining "No" in determination of "operation command received?" (S21) and determining "Yes" in determination of "connection requested?" (S22) further. Then, the main body communication control unit 13 determines "presence" of the downstream side connection device in step S23 (S23: Yes), and shifts to step S27.

In step S27, the main body communication control unit 13 disapproves the connected state to the remote controller 9, and replies to the remote controller 9 that the remote controller 8 is already connected.

Referring to FIG. 3 again here, in such a situation, the remote controller 9 is determined as not being in the connected state yet in determination in step S6 (S6: No), and shifts to step S8 to transmit (Bluetooth) the connection request to the main body communication control unit 13 of the display device 7.

After processing of step S8, the operation is shifted to step S9, and in the step, since the remote controller 8 is already connected as described above, connection disapproval is received (Bluetoothed).

Then, the communication control unit 23 of the remote controller 9 requests the connection to the remote controller 8 already connected to the main body communication control unit 13 of the display device 7, according to the sequence stored in the transmission sequence storage unit 25 (S10).

When the connection is permitted from the remote controller 8, the connection processing is executed by step S11 through step S9, and then the operation command to the remote controller 8 is transmitted (Bluetoothed) (S7).

That is, though the main body communication control unit 13 of the display device 7 cannot be remotely controlled directly by the remote controller 9, the main body communication control unit 13 of the display device 7 is remotely controlled through the remote controller 8, and the display unit 12 can be remotely controlled as a result.

In the meantime, when a cellular phone of another person is to be utilized as a remote controller further, since the remote controller 9 is already connected to the remote controller 8, "Yes" is determined in step S3, resulting in advancing to step S12.

That is, at the time, the cellular phone of another person advances through steps S1, S6, S8, S9, S11 and S7 in the flow illustrated in FIG. 3, and is connected to the remote controller 9. Then, the remote controller 9 can remotely control the main body communication control unit 13 of the display device 7 through the remote controller 8.

While the case with two remote controllers has been described in the embodiment described thus far, the present invention is not limited to this aspect. Three or more remote controllers may remotely control the display device.

For instance, when three remote controllers are to utilize the remote control system according to the present invention, the third remote controller includes, similarly to the first and second remote controllers described above, a third command reception unit and a third command transmission unit that perform transmission and reception to/from the main body command reception unit and the main body command transmission unit of the display device, a third communication control unit connected to the third command reception unit and the third command transmission unit, and a third operation unit connected to the third communication control unit.

INDUSTRIAL APPLICABILITY

As described above, the main body communication control unit of the display device in the present invention is configured to permit the connection to a first remote controller when not being in the connected state to a second remote controller when the connection is requested from the first remote controller, and to disapprove the connection to the first remote controller and prompt the first remote controller to be connected to the second remote controller when being in the connected state to the second remote controller when the connection is requested from the first remote controller.

By attaining such a configuration, cellular phones owned by individuals for instance can be used as the first and second remote controllers that remotely control the display device, and the operability is improved since there is no need of taking the trouble to prepare exclusive remote controllers.

Therefore, utilization as various kinds of remote control systems can be expected.

REFERENCE SIGNS LIST

1 Automobile
2 Car interior
3 Driver's seat
4 Front passenger's seat
5 Handle
6 Rear seat
7 Display device
8 Remote controller
9 Remote controller
10 Display control unit
11 Display unit
12 Display unit
13 Main body communication control unit
13a Transmission sequence storage unit
14 Main body command reception unit
15 Main body command transmission unit
16 Command reception unit
17 Command transmission unit
18 Communication control unit
19 Operation unit
20 Transmission sequence storage unit
21 Command reception unit
22 Command transmission unit
23 Communication control unit
24 Operation unit
25 Transmission sequence storage unit

The invention claimed is:

1. A remote control system comprising a display device and first and second remote controllers that remotely control the display device, wherein the display device comprises a display control unit, a plurality of display units connected to the display control unit, a main body communication control unit connected to the display control unit, and a main body command reception unit and a main body command transmission unit connected to the main body communication control unit, the first remote controller comprises a first command reception unit and a first command transmission unit that perform transmission and reception to/from the main body command reception unit and the main body command transmission unit of the display device, a first communication control unit connected to the first command reception unit and the first command transmission unit, and a first operation unit connected to the first communication control unit, the second remote controller comprises a second command reception unit and a second command transmission unit that perform transmission and reception to/from the main body command reception unit and the main body command transmission unit of the display device, a second communication control unit connected to the second command reception unit and the second command transmission unit, and a second operation unit connected to the second communication control unit, and the main body communication control unit of the display device is configured to permit connection to the first remote controller for communicating with the display control unit to control a first display unit of the plurality of display units when not being in a connected state to the second remote controller when the connection is requested from the first remote controller, and to disapprove the connection to the first remote controller and prompt the first remote controller to be connected to the second remote controller for communicating remote control commands through the second remote controller to the display control unit to control the first display unit of the plurality of display units when being in the connected state to the second remote controller for communicating with the display control unit to control a second display unit of the plurality of display units when the connection is requested from the first remote controller.

2. The remote control system according to claim 1, comprising first, second and third remote controllers that remotely control the display device, wherein the third remote controller comprises a third command reception unit and a third command transmission unit that perform transmission and reception to/from the main body command reception unit and the main body command transmission unit of the display device, a third communication control unit connected to the third command reception unit and the third command transmission unit, and a third operation unit connected to the third communication control unit.

* * * * *